United States Patent [19]
Roziere et al.

[11] Patent Number: 5,120,950
[45] Date of Patent: Jun. 9, 1992

[54] PROCESS OF CORRECTION OF SIGNALS FROM A LINEAR RADIATION DETECTOR AND CORRECTION DEVICE USING THIS PROCESS

[75] Inventors: Guy Roziere, Voreppe; Paul Petit, Lyons, both of France

[73] Assignee: Thomson Tubes Electroniques, Boulogne Billancourt, France

[21] Appl. No.: 570,797

[22] Filed: Aug. 22, 1990

[30] Foreign Application Priority Data

Aug. 22, 1989 [FR] France .................. 89 11105

[51] Int. Cl.⁵ .................................... H01J 40/14
[52] U.S. Cl. .................................... 250/208.1; 382/50
[58] Field of Search .............. 250/208.1, 208.2, 208.3, 250/214 C, 223, 562, 563; 356/431; 282/50, 53; 358/108, 163

[56] References Cited

U.S. PATENT DOCUMENTS

| | | | |
|---|---|---|---|
| 3,840,857 | 10/1974 | Knight et al. | 382/33 |
| 4,341,956 | 7/1982 | Bax | 250/214 |
| 4,647,981 | 3/1987 | Froelich | 250/208.1 |
| 4,864,651 | 9/1989 | Ogiwara et al. | 250/208.3 |

FOREIGN PATENT DOCUMENTS 0250757 1/1988 European Pat. Off. .
0346878 12/1989 European Pat. Off. .
2570507 3/1986 France .

*Primary Examiner*—David C. Nelms
*Assistant Examiner*—Que T. Le
*Attorney, Agent, or Firm*—Oblon, Spivak, McClelland, Maier & Neustadt

[57] ABSTRACT

A process for the development of a corrective term, process which can be applied during the acquisition of signals of analog measurements (S1 to Sn) of a radiation detector (21) by an acquisition device (22). Measuring signals (S1 to Sn) are corrected then transmitted to acquisition device (22) in digital form.

According to the invention, the measuring signals (S1 to Sn) are corrected analogically before transmitting them to acquisition device (22) by a main analog-to-digital converter (31). This makes it possible to reduce the number of bits required for analog-to-digital converter (31). The process of the invention applies in particular in correcting measuring signals (S1 to Sn) as a function of the dark current.

12 Claims, 2 Drawing Sheets

PROCESS OF CORRECTION OF SIGNALS FROM A LINEAR RADIATION DETECTOR AND CORRECTION DEVICE USING THIS PROCESS

BACKGROUND OF THE INVENTION

1. Field of the Invention

The invention relates to a process of correction of measuring signals provided by a radiation detector of the bar detector type. It also relates to a correction device in which this process is used.

2. Discussion of Background

Bar-type radiation detectors can be used to pick up various types of radiation, for example, light, x radiation, alpha-radiation, beta-radiation, gamma-radiation, neutrons, etc. . .

These detectors generally consist of elementary sensors placed behind one another most often along a single line. These elementary sensors are frequently of the photosensitive type, and in the case of radiations other than the light, a converter of energy into light energy and placed between these photodetectors and the radiation source, the converter or scintillator element being a substance suitable for the nature of the radiation.

One of the important applications of the bar detectors or linear detectors is the scanning imagery. The scanning imagery with such detectors is used in particular in the following cases:

for objects in movement of translation, for example, a production line conveyor belt;

in the case where very high dynamics of detection is essential: the linear detectors or bar detectors are then preferable to the matrix- or surface-type detectors in which the photosensitive surfaces are small in particular to reserve a surface required by the presence of many conductors placed in lines and in columns;

in the case of objects of large dimension, a case in which it is possible to use linear detectors which are modular and can be joined;

in the case of x rays, in industrial engineering as well as in radiodiagnostics: scanning radiology is particularly advantageous because it makes it possible to obtain an excellent rejection of the diffused radiation.

By taking, for example, the bar-type detectors or the linear detectors used for the scanning imagery by x rays, for example for the recognition of an object in movement on conveyor belts such as in the luggage inspection installations usually encountered in airports:

the linear detector is often stationary, and it consists of multiple elementary sensors, placed along the same line which is approximately perpendicular to the direction of movement of the objects;

a source of x rays is placed so that the conveyor belt passes between this source and the linear detector;

the x radiation emitted by the source passes through collimation means which impart to it the shape of a fan-shaped beam whose plane is placed along the length of the linear detector;

frequently, the scintillator consists at the level of each elementary sensor, i.e. a layer of scintillating substance is deposited on each elementary sensor.

Thus, the relative movement between, on the one hand, the object, and, on the other hand, the unit formed by source X and the linear detector makes it possible to produce an image of the object which corresponds to the absorption in transmission of the x radiation by the object. Along the linear detector, the definition of this image depends on the number of elementary sensors, while concurrently to the movement of the object, the definition of the image is given by the number of measurements performed by each elementary sensor. The same elementary sensor is used for the acquisition of a large number of image points, all the values of the image achieved with the same elementary sensor during the analysis of the object forming the same line or column of the image of this object.

A free zone of the conveyor belt, located in front of the first object to be examined, is often used to develop one or more correction coefficients, in particular for a correction of the gain and for a correction of the dark signal of each elementary sensor.

Actually, each elementary sensor has a characteristic gain and delivers a characteristic dark signal due in particular to electric leakage currents. Also, to make a good-quality image, it is necessary to correct each measuring value corresponding to a point of the image, with corrective terms characteristic of the elementary sensor having delivered the measuring value.

For a surface (matrix) sensor, a precision of 1 to 3% in corrective terms is generally sufficient, because the effects of correction errors do not have any correlation between points of the image.

In the case of a linear detector, the same elementary sensor is used for the acquisition of a large number of points which form, for example, a line of the image. An inaccuracy in the acquisition of corrective terms characteristic of each elementary sensor affects an entire line of the image, so that the errors in the values of the image points are correlated on the same line. The eye is very sensitive to such correlated errors, which makes it necessary to search for inaccuracies in the correction coefficients lower than 1% and often close to $10^{-3}$.

For each elementary sensor, the corrective terms of the dark current and of the gain are obtained by processing a large number of signals delivered by each elementary sensor, to minimize the effects of the temporary noise of the elementary sensor or the radiation flux. These signals provided by each sensor can be processed according to a true average method or else according to a so-called moving or recursive average method.

FIG. 1 is a diagram of functional blocks of an electronic unit, which makes it possible to illustrate a process of the prior art to develop, and to store, corrective terms intended to correct the values of the measuring signals delivered by each elementary sensor of a linear radiation detector.

In the example which is described below, the dark current values of each of the sensors of a linear detector or bar detector DB are determined by a moving average method.

Linear detector DB is of the type, for example, used in airports for the inspection of luggage. Linear detector DB comprises multiple elementary sensors C1, C2, . . . , Cn, placed on a single line, and which are each linked to an electronic switching device or multiplexer 2 to which each of the sensors delivers a measuring signal S1, S2, . . . , Sn. These signals S1 to Sn are intended to be applied, one after the other, to an analog-to-digital converter 3 to which multiplexer 2 is linked; for this purpose, multiplexer 2 selects one of signals S1 to Sn and delivers through its output a selected measuring signal SMS which is applied to analog-to-digital converter 3. Selected signal SMS is in an analog form, and it is converted into digital data by converter 3; this digital data is available at the output of analog-to-digital converter 3 on parallel connecting lines or bus 4. Bus 4 is linked, on the one hand, to a subtracting device 5, and, on the other hand, to an adding device 6, to which it applies the digital data which corresponds to signal SMS selected from signals S1 to Sn delivered by elementary sensors C1 to Cn.

The data transported by bus 4 represents a rough value, not corrected by the corrective term, and subtractor 5 delivers corrected data DC which is applied to a main acquisition device DPA. This acquisition device DPA has the function, in a conventional manner, of processing and storing corrected data DC, to construct an image of an object (not shown) formed with an x radiation, which, after having passed through this object, has been converted into light so as to be picked up by the photosensitive cells of each of elementary sensors C1 to Cn.

For a good understanding of the following, it is useful to specify some details of operation of the x-ray luggage inspection equipment. The operation of this equipment can be broken down into three phases:

in a first phase, measuring signals S1 to Sn are acquired from each of sensors C1 to Cn in the absence of x radiation; signal S1 to Sn which is then delivered by each of the elementary sensors corresponds to the dark signal or dark current characteristic of each of these sensors. For each of these elementary sensors, the value of the dark current is determined after a large number of acquisitions of signals S1 to Sn. These signals S1 to Sn are converted into digital data by same converting device 3, also these acquisitions are made sequentially, i.e. that first measuring signal S1 is processed first of all, then second signal S2, and so on until signal Sn, which is the last one of an acquisition cycle; and first signal S1 is then taken up again during the next acquisitions cycle. At the end of the acquisition cycles in this first phase, the value of the corrective term for the dark current is set and can be used to be subtracted at the level of subtractor 5 of the rough data delivered by converter 3.

the second phase of operation can be used in the case of a gain correction. For this purpose, a large number of acquisition cycles of signals S1 to Sn delivered by sensors C1 to Cn is made in the presence of an x radiation, but without the radiographed object being placed between linear detector DB and the x-ray source. This corresponds to an illumination of calibration. It should be noted that current I or signal delivered by an elementary sensor, elementary sensor of photosensitive type, for example, can be defined by the following relation: $I = I_o + k \cdot E$, or $I_o$, is the dark current, i.e., the current in the absence of illumination (without x rays); k is the coefficient or gain characteristic of each elementary sensor, and E is the illumination. Illumination E is a known constant, and the value of dark current $I_o$ having been determined in the first phase of operation, the value of gain k can be deduced for each elementary sensor and this value can be refined by a large number of acquisitions;

finally, the third phase is the measuring phase in which the radiographed object moves between the source and the linear detector. In this phase, signals S1 to Sn are corrected firstly by the corrective terms of dark current, then next by the corrective terms of gain before being transmitted to an acquisition device used to form the image of the radiographed object.

Unit 1 of the prior art shown by way of example in FIG. 1 makes it possible to define the value of dark current $I_o$ in a first phase such as mentioned above, in which the operation is performed without x radiation.

Linear detector DB and multiplexer 2 are linked to a second connecting network or bus 7 to which are also connected an address counter 8 and a read-write memory (RAM) 10; address counter 8 is synchronized by a clock 9, and it has the function in particular of controlling with the suitable phase the operations of linear detector DB, of multiplexer 2 and of RAM memory 10. This makes it possible, for example, to reinitialize the potentials at the level of each sensor C1 to Cn after each acquisition of the measuring signal provided by the latter, and to address the memory cells (not shown) contained in RAM memory 10 and which are each intended to store the data which corresponds to the data delivered by that of sensors C1 to Cn to which it is indexed. In short, a memory cell of RAM memory 10 corresponds to each elementary sensor C1 to Cn, and each of these memory cells contains the combination of N values obtained for elementary sensor C1 to Cn being considered.

During the acquisition cycle of signals S1 to Sn or the reading cycle, any new value is added to the contents already stored in the corresponding memory cell; this result is then multiplied by a number N, then divided by N+1, then written in the memory cell in place of the preceding number. In this manner, at any moment, each memory cell of RAM memory 10 contains the weight sum of a large number of samples. The weighting coefficient decreases for each contribution with its seniority. Mathematically, this system is equivalent to a simple low-pass filter of the first order for each pixel; the equivalent time constant is: $N \times T$, where T is the period of the acquisition cycle.

Thus, for example, at a given moment when a measuring signal, signal S1, for example, delivered by first elementary sensor C1, is transmitted to analog-to-digital converter 3: the corresponding digital value is applied to a first input ES1 of subtractor 5 as well as to a first input EA1 of an adder 6. At the same time, address counter 8 addresses RAM memory 10 so that the value contained in the memory cell assigned to first elementary sensor C1 is applied to a second input ES2 of subtractor 5 and to a second input EA2 of adder 6. This adder 6 adds the value contained in the memory cell and the new value corresponding to last signal S1; this sum, in the form of digital data, is applied by a connection 16 (of bus type) to a multiplier circuit 11 which performs on this sum the operation N/N+1, where N is the number of acquisitions already performed of signal S1.

The new value defined by multiplier 11 is applied to read-write RAM memory 10, by a supplementary memory 13, to be written in the memory cell concerned in place of the preceding value; buffer memory 13 being necessary to wait for RAM memory 10 to pass from the "reading" phase to a "writing" phase.

During this entire first phase, subtractor 5 does not operate, and at the end of this phase, the contents of the memory cells of RAM 10 are set, and they constitute the corrective terms of the dark current. In the next phase, which can be that of the development of corrective terms of gain, the contents of the memory cells of RAM 10 are applied to subtractor 5 in the same order as measuring signals S1 to Sn, so that the corresponding value of dark current is subtracted from each value of signal S1 to Sn; the result of the subtraction being a corrected data item DC.

This part of the operation where the correction is performed is identical with the operation which is performed in the case where the value of the dark current is determined by a true average method. The method, in the case of the true average, is very close: actually, in this case, after digitalization of the signals, a digital memory (similar to RAM 10) addressed by the number of the elementary sensor (or all one-to-one functions of this number) contains the sum of N successive values (N is often a power of 2). This sum is divided by N (this is often obtained by abandonment of low order bits if N is a power of 2) to constitute an average, and this average is subtracted in the measurement to perform the correction.

In the case of a gain correction, the correction is made by dividing the measurement by the corrective term thus obtained, i.e. that the subtractor circuit is replaced by a multiplier circuit.

Of the drawbacks that the method, which was just described in reference to FIG. 1, presents, there is a particularly troublesome one which resides in the fact that it is necessary to use an analog-to-digital converter with very great precision and very high dynamics: thus, for example, it is usually necessary to use at this level analog-to-digital converters of 12,000 points or more (i.e. of at least 14 bits). As a result, such a converter is of a considerable cost able to represent by itself alone about one third of the cost of the unit. Another very unfavorable point comes from the fact that using an analog-to-digital converter with very high dynamics tends to reduce in a significant way the speed of operation of the unit and leads as a result to limiting the speed of passage of the conveyor belt on which the objects are in movement or to limiting the number of acquisition cycles to develop the corrective terms.

SUMMARY OF THE INVENTION

This invention relates to a process of correction which can be applied to the correction of measuring signals of a linear radiation detector. The process of the invention does not present the drawbacks that the processes already known comprise, particularly concerning the use of an analog-to-digital converter of very high dynamics. The invention also relates to a correction device making possible the use of the process of the invention.

According to the invention, a process of correction of the measuring signals of a linear radiation detector, the linear detector comprising elementary sensors delivering said measuring signals in analog form, the process comprising a development phase of a corrective term characteristic of each of the elementary sensors, each corrective term being stored in digital form in a memory cell characteristic of the corresponding elementary sensor, the process then consisting in an acquisition phase of measuring signals, in performing a correction of the value of each of the measuring signals as a function of the value of the corresponding corrective term, the corrected measuring signals being transmitted to an acquisition device, the process being characterized in that it consists in performing in analog form the correction of the measuring signals by the corrective terms, then in converting the corrected measuring signals into digital data with an analog-to-digital converter to transmit them to the acquisition device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
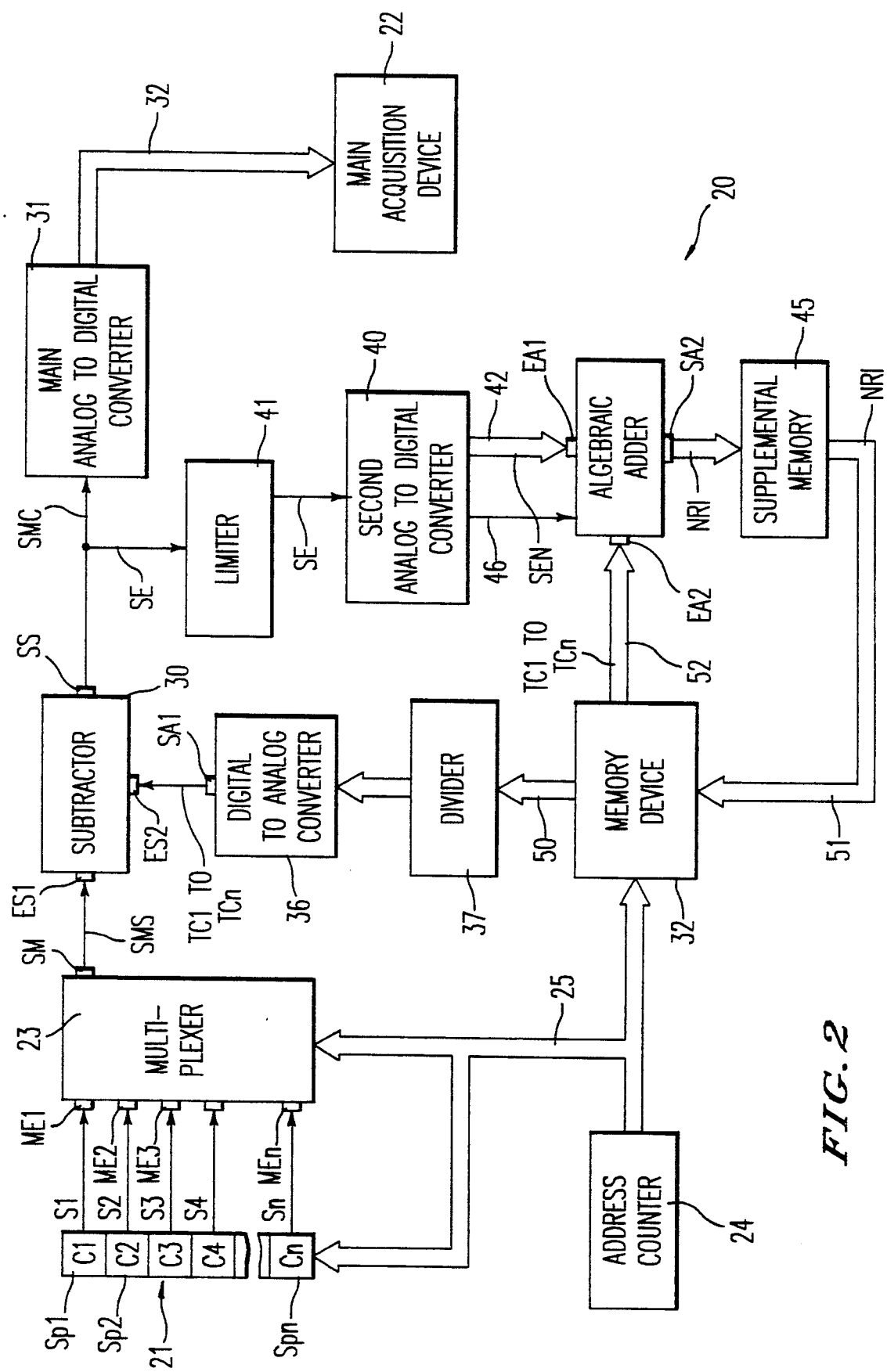
FIG. 2 is the diagram of an electronic device operating according to the process of the invention.

Referring now to the drawings, wherein like reference numerals designate identical or corresponding parts throughout the several views, and more particularly to FIG. 2 thereof, FIG. 2 is a diagram of functional blocks of a correction device 20 making it possible to use the process of correction according to the invention. The process of the invention applies to the correction of measuring signals S1 to Sn delivered by a linear radiation detector 21, during the acquisition in sequential reading of these measuring signals by a main acquisition device 22.

Figure 1:
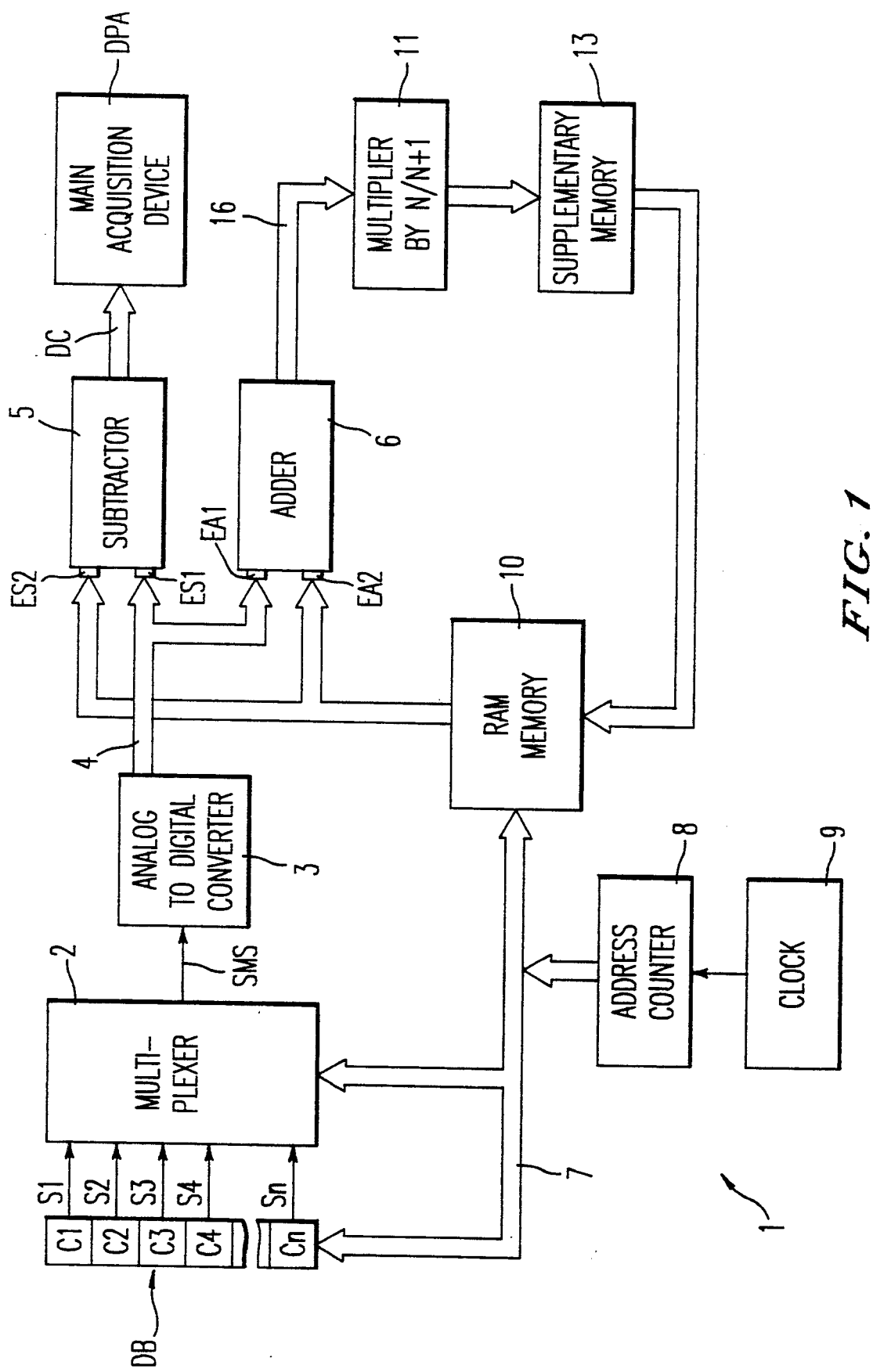
FIG. 1, already described, shows the diagram of an electronic unit operating according to a process of the prior art to correct the signals delivered by a linear radiation detector.

In the nonlimiting example of the description, linear detector 21 is of a type similar to that already described in reference to FIG. 1, i.e. provided to be used in the framework of the scanning imagery by x rays, in particular for the inspection of objects in airports; consequently, linear detector 21 comprises multiple elementary sensors C1 to Cn formed by photosensitive elements and placed on a single line, and of which one photosensitive surface Sp1 to Spn is coated with a layer of a scintillating material.

The main acquisition device has the function of processing the data delivered by each of sensors C1 to Cn to reconstruct, in a manner standard in the art, the image of an object having been radiographed. In the nonlimiting example described, the process of the invention applies particularly to the correction of the dark current of each of sensors C1 to Cn, but it is to be understood that the invention can also be applied to correct other parameters, the gain, for example, of elementary sensors C1 to Cn.

In a measuring phase, the reading of elementary sensors C1 to Cn, i.e. the acquisition of signals S1 to Sn that the latter deliver, by main acquisition device 22, is achieved sequentially. For this purpose, in the nonlimiting example of the description, sensors C1 to Cn are each linked to an input ME1 to MEn of a multiplexer 23. Multiplexer 23 and linear detector 21 are controlled by an address counter 24, by a bus 25, so that an output SM of multiplexer 23 is successively switched from one to the next of these inputs ME1 to MEn to deliver a selected measuring signal SMS which, successively, corresponds to each of measuring signals S1 to Sn. It should be noted that the organization shown in FIG. 2 between linear detector 21, multiplexer 23 and address counter 24 is given only by way of nonlimiting example, other arrangements can be used to transmit sequentially measuring signals S1 to Sn such as, for example, with a shift register (not shown) with parallel inputs and with a serial output.

As has been mentioned in the introductory clause, the measuring phase in which an object is radiographed occurs after at least one phase in which, for each elementary sensor C1 to Cn, a corrective term is developed; this corrective term is stored and it is used, in the measuring phase, to correct the value of the signal delivered by elementary sensor C1 to Cn to which it is indexed.

It is recalled that in the case the corrective terms defined as a function of the dark signal or dark current of elementary sensors C1 to Cn, these corrective terms can be used in another correction phase, other phase in which corrective terms are developed as a function of the gain of each of the elementary sensors: in this case, the corrective terms are developed from values already corrected as a function of the dark signal. It should be noted that in some cases where the dark signal can be considered as insignificant, the signals of the elementary sensors can be processed to develop directly the corrective terms as a function of the gain.

The example of FIG. 2 illustrates the application of the invention to the correction of the dark current, and as a result, correction device 20 comprises correction means which comprise a subtracting element 30. This subtractor 30 makes it possible for each sensor C1 to Cn to subtract the value of a corrective term, characteristic of each sensor, from the value of measuring signal S1 to Sn delivered by the elementary sensor being considered. For this purpose, selected measuring signal SMS delivered at output SM of multiplexer 23 is applied to a first input ES1 of substractor 30, and a second input ES2 of this subtractor receives corrective term TC1 to TCn, corresponding to elementary sensor C1 to Cn whose measuring signal is at this moment transmitted to subtractor 30.

According to a characteristic of the invention, the correction of the signals delivered by each of elementary sensors C1 to Cn is performed when these signals are in an analog form. As a result, subtractor 30 is itself an analog means, a standard differential amplifier, for example. An output SS of subtractor 30 delivers in analog form a corrected measuring signal SMC, and this corrected measuring signal is applied to an analog-to-digital converter 31 called main converter, which converts the analog value of corrected measuring signal SMC into digital data which is transmitted, by a bus-type connection 32, to main acquisition device 22.

Under these conditions, subtractor 30, which in the nonlimiting example represents the correction means, performs analogically, and consequently, it preserves the dynamics of main converter 31, by making it possible for it to convert only the useful range of the variations of the signal, to the exclusion of the shift voltages due to the dark current. As a result, main converter 31 can have a much lower number of bits than in the prior art, for example 8 to 12 instead of 14, which makes it possible to divide by about 5 to 10 the cost of this element and which further makes it possible to increase the speed of operation of the unit.

Corrected measuring signals SMC are converted into digital values which are transmitted to main acquisition device 22 in the measuring phase, and in this phase, the corrective term characteristic of each elementary sensor C1 to Cn is already defined, i.e. that a corrective value stored in a memory cell assigned to each sensor is already set. During a preceding phase, the corrective values characteristic of each elementary sensor C1 to Cn are developed, and in this phase, these corrective values can be modified from one acquisition cycle to the next acquisition cycle.

A sequence in which all elementary sensors C1 to Cn are read successively after the latter have been exposed to radiation for the same time interval is called an acquisition cycle; these acquisition cycles are repeated one after the other during the relative movement between the object and the linear source-detector unit, so that at each acquisition measuring cycle, a new measuring signal S1 to Sn is provided by each of elementary sensors C1 to Cn.

In the version of the process of the invention described by way of nonlimiting example, corrective term TC is determined according to a recursive average type method. Each corrective term TC1 to TCn is stored in a memory cell (not shown) assigned to each elementary sensor C1 to Cn. The memory cells are contained in a digital-type memory device 32 with read-write memory (RAM memory), each memory cell having an address which is a function of the number of elementary sensor C1 to Cn to which it corresponds. Address counter 24 is linked to memory device 32 by bus-type connections 25 so that the memory cell addressed is that which corresponds to elementary sensor C1 to Cn whose measuring signal is at the same time applied to first input ES1 of subtractor 30.

To develop a corrective term, the operation is the following:

at the outset, i.e. during the first cycle of acquisition or reading of sensors C1 to Cn, for each of these sensors, the corresponding memory cell contains a data item of arbitrary value; this arbitrary digital data item is converted into analog value by a digital-to-analog converter 36, preferably (but not obligatorily) after having been divided by a divider 37 whose role will be explained below in the description. This digital value converted into analog value by converter 36 is delivered by an output SA1 of the latter, and it then constitutes an intermediate result or intermediate corrective term which is applied to second input ES2 of subtractor 30. Subtractor 30 subtracts the value of the intermediate corrective term from the value of measuring signal S1 to Sn represented by selected measuring signal SMS. Corrected measuring signal SMC delivered by output SS of subtractor 30 constitutes in this phase an error signal SE which is applied to a second analog-to-digital converter 40, either directly or by a limiter device 41 whose presence is desirable but not essential, as is explained in more detail below in the description.

Second analog-to-digital converter 40 is preferably to be a quick converter, but at this level, it can be of low dynamics with a small number of bits (and therefore of low cost) because it does not operate on the entire signal but only on the difference between the value of signal SMS applied to first input ES1 of subtractor 30 and the value of the intermediate corrective term applied to second input ES2; this difference then constituting error signal SE. This error signal SE is converted by second analog-to-digital converter 40 into a digital error signal SEN which, by a bus-type connection 42, is applied to an element 43 performing, in a manner standard in the art, the function of algebraic adder. In the nonlimiting example described, second analog-to-digital converter 40 is further linked by a connection 46 to algebraic adder 43 to provide to the latter the sign + or − to which error signal SE is assigned.

It should be noted, on the one hand, that subtractor 30 can consist, as has been previously mentioned, of an analog amplifier, which can deliver at output SS an error signal SE which is positive or negative relative to a reference voltage; on the other hand, this error signal can be superposed on a reference voltage to be applied to second analog-to-digital converter 40, so that the latter can be used in the "center zero" mode. In "center zero" operation, in a way conventional in the art, one of the bits can be used to indicate the sign of the signal to be converted (most often, it is the bit of the highest weight), and the other bits are used to code in binary mode the value of this signal.

Algebraic adder 43 receives on a first input EA1 the digitized value of error signal SE, and it receives on a second input EA2 a digital value which is the value of intermediate corrective term TCI1 to TCIn or intermediate result contained in the memory cell of memory device 32, the memory cell being that which is in the process of addressing, i.e. the memory which is assigned to elementary sensor C1 to Cn whose measuring signal has been applied to subtractor 30 to form error signal SE.

The algebraic addition of digitized error signal SEN and intermediate result TCI contained in the memory cell is performed. Then, at output SA2 of algebraic adder 43, for same elementary sensor C1 to Cn, a new intermediate result NRI is obtained which can be recorded in the memory cell in place of the preceding intermediate result. For this purpose, new intermediate result NRI is applied to memory device 32 by a supplementary memory 45; supplementary memory 45 makes it possible in a manner standard in the art to store new intermediate result NRI during the time which is necessary to make memory device 32 pass from "reading" to "writing." It should be noted in connection with this that for a better understanding of the functions in FIG. 2, on the one hand, memory device 32 is linked to algebraic adder 43 by a bus-type connection 52 to transmit to it intermediate result TCI1 to TCIn contained in the addressed memory and that, on the other hand, supplementary memory 45 is linked to memory device 32 by a bus-type connection 51 also to transmit to it new intermediate result NRI which is to be written in the memory cell; but, of course, these two connections 52, 51, are in practice linked to one another, and they are differentiated here only by the fact that connection 51 between the buffer memory and memory device 32 corresponds to a writing phase and that connection 52 between memory device 32 and algebraic adder 43 corresponds to a reading phase, just as, moreover, a bus-type connection 50 linking memory device 32 to divider 37.

This operation is repeated in the same cycle of acquisition or reading for all elementary sensors C1 to Cn, and it is repeated on a large number of successive reading sequences, while the development phase of the corrective term lasts. At the end of this phase, the contents of each memory cell are set and constitute a corrective term TC which can be used to perform the subtraction.

In development phase of the corrective term, error signal SE being digitized then added algebraically to the contents of the memory cell at each reading cycle, a cancelling of the error is obtained after multiple successive actions, the contents of the memory cell are equivalent to the integral of the errors.

For each elementary sensor, the contents of the corresponding elementary cell tend to the product of a constant A by the average value of the measurement. Constant A is the dividing number by which, in divider 37, the corrective terms and the intermediate results delivered by an elementary memory cell of memory device 32 can optionally be divided before being used in the subtraction in subtractor 30. This division has as its object to increase the time constant of the loop formed by subtractor 30, algebraic adder 43 and memory device 32, to integrate a great variation of the value of a measuring signal relative to preceding measuring signals delivered by the same sensor and to prevent too great an error signal SE from being produced. This division is symbolized in FIG. 2 by divider 37, but in practice, it can be achieved in a simple manner by abandonment of the binary bits of smaller weight between the output of memory device 32 and the input of digital-to-analog converter 36; of course, in this case, constant A is to be a power of 2. It should be noted that the contents of a memory cell tend to A multiplied by the average value of the measurement, with a time constant equal to $T.A/2^{n1-n2}$; where T is the time of a reading cycle; n1 and n2 are respectively the number of bits of digital-to-analog converter 36 and of analog-to-digital converter 40.

The digital-to-analog converter can be a quick converter (several hundreds of nanoseconds, for example) operating with a large number of bits (12 bits), such quick digital-to-analog converters with large numbers of bits being available on the market at reasonable costs.

The function of clipping or limiting error signal SE, standard in the art, symbolized by limiter 41, consists in limiting error signal SE positively and negatively relative to the reference voltage already mentioned, delivered by output SS of subtractor 30. This limiting has as its object to protect the second analog-to-digital converter from possible overflows of values of error signal SE relative to the capacity of this converter.

The process of correction according to the invention makes it possible to operate with high action dynamics without comprising the quickness of operation, and it makes it possible to reduce in a considerable manner the cost of the main analog-to-digital converter by using the existence and the reasonable cost of quick digital-to-analog converters with large numbers of bits; the quick analog-to-digital converter used to process error signal SE further being able to be of low dynamics (small number of bits) and therefore also of low cost.

What is claimed as new and desired to be secured by Letters Patent of the United States is:

1. A process of correction for measuring signals of a linear radiation detector having elementary sensors delivering said measuring signals in analog form, comprising:
   a phase of development of corrective terms characteristic of the elementary sensors, including storing each corrective term in digital form in a memory cell assigned to a respective elementary sensor;
   an acquisition phase of acquiring measuring signals; and
   a correction phase including performing a correction of each measuring signal as a function of the value of the corresponding corrective term developed in said correction phase, including performing in analog form the correction of measuring signals by means of the corrective terms and converting corrected measuring signals into digital data and transmitting the digital data to an acquisition device.

2. The process of correction according to claim 1, comprising:

said development phase comprising reading elementary sensors sequentially several times and at each time and for each elementary sensor developing intermediate terms which are each converted into digital data and stored in the memory cell attributed to the respective elementary sensor; and utilizing a recursive average principle in the correction phase to develop each corrective term, including taking the difference in analog form between each measuring signal and its respective intermediate term, converting the difference into digital difference data, and performing an algebraic addition of the stored intermediate term and the digital difference data so as to form a new intermediate term which is stored in a place of the preceding intermediate term.

3. The process of correction according to claim 1, wherein the correction is made of a dark current of elementary sensors and includes subtracting the value of the corrective term from the value of the measuring signal.

4. The process of correction according to claim 1, comprising:

subtracting the correction term from the measuring signal by means of a subtractor which also determines the difference between the measuring signals and the respective intermediate terms.

5. The process of correction according to claim 1, wherein in the developing of said correction terms, a center zero principle is used to convert the analog difference into digital data.

6. The process of correction according to claim 1, comprising:

utilizing a closed loop to develop each corrective term.

7. Correction device for correction of measuring signals of a linear radiation detector having elementary sensors delivering measuring signals in analog form, comprising:

means for developing corrective terms corresponding to respective of said elementary sensors and a memory for storing said corrective terms in digital form;

means for converting the stored correction terms to analog form;

means for correcting in analog form measuring signals obtained from respective of said elementary sensors in analog form by means of respective of said correction terms converted to analog form;

means for converting the corrected measuring signals into digital form and applying the digital form of corrected measuring signals to an acquisition device.

8. Device according to claim 7, wherein said means for forming corrective terms comprises:

means for forming intermediate corrective terms and storing said intermediate corrective terms in a memory, and means for forming a recursive average of said intermediate corrective terms and correcting said measuring signals based on said recursive average.

9. Device according to claim 8, wherein said means for forming a recursive average comprises:

means for forming a difference in analog form between the measuring signal and the intermediate correction term;

means for converting said difference in analog form into digital difference data;

means for performing algebraic addition of said digital difference data with said intermediate corrective term so as to form a new intermediate corrective term; and means for storing said new intermediate corrective term in place of the preceding intermediate corrective term.

10. Device according to claim 9, wherein said correction means comprises:

subtracting means for subtracting correction terms from respective of said measuring signals, said subtracting means also taking the difference in analog form between said measuring signals and said intermediate corrective terms.

11. Device according to claim 10, wherein said means for converting the corrected measuring signals to digital form comprises:

an analog-to-digital converter which operates according to a zero center principle.

12. Device according to claim 11, wherein the analog-to-digital converter operating according to said center zero principle has lower dynamics relative to a means for converting the corrected measuring signals to digital form.

* * * * *